United States Patent
DiMascio et al.

[19]

[11] Patent Number: 5,858,191
[45] Date of Patent: *Jan. 12, 1999

[54] ELECTRODEIONIZATION APPARATUS AND METHOD

[75] Inventors: Felice DiMascio, North Andover; Gary C. Ganzi, Lexington, both of Mass.

[73] Assignee: United States Filter Corporation, Palm Desert, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 747,505

[22] Filed: Nov. 12, 1996

Related U.S. Application Data

[63] Continuation-in-part of Ser. No. 717,781, Sep. 23, 1996.

[51] Int. Cl.$^6$ .................................................. B01D 61/48
[52] U.S. Cl. ......................... 204/524; 204/529; 204/533; 204/536; 204/632; 204/647
[58] Field of Search .................................... 204/524, 529, 204/533, 536, 632, 647

[56] References Cited

U.S. PATENT DOCUMENTS

| 2,514,415 | 7/1950 | Rasch | 136/26 |
| 2,794,777 | 6/1957 | Pearson | 204/151 |

(List continued on next page.)

FOREIGN PATENT DOCUMENTS

| 0 680 932 | 11/1995 | European Pat. Off. . |
| 47- 49424 | 12/1972 | Japan . |
| WO9746492 | 12/1997 | Japan . |
| 776469 | 6/1957 | United Kingdom . |

OTHER PUBLICATIONS

International Search Report, PCT/US97/17190, dated Jan. 15, 1998.
Johnson et al., Desalting by Means of Porous Carbon Electrodes, Mar. 1971, pp. 510–517, Electrochemical Technology, vol. 118, No. 3.
G.J. Gittens et al., Some Experimental Studies of Electro-deionisation Through Resin Packed Beds, Mar. 1964, Harwell, Chemistry Div., U.K.A.E.A. Research Group, Atomic Energy Research Establishment.
Simons, Electric Field Effects on Proton Transfer Between Ionizable Groups and Water in Ion Exchange Membranes, 1984, pp. 151–158, Electrochemical Technology.
Simons, Nature, vol. 280, Strong Electric Field Effects on Proton Transfer Between Membrane–Bound Amines and Water, Aug. 30, 1979, pp. 824–826.
Siimons, Water Splitting in Ion Exchange Membranes, 1985, pp. 275–282, Pergamon Press Ltd.
Glueckauf, Electro–Deionisation Through a Packed Bed, Dec. 1959, pp. 646–651, British Chemical Engineering.
Matĕika, Continuous Production of High–Purity Water by Electro–deionisation, Apr. 1971, pp. 117–120, J. Appl. Chem. Biotechnol., vol. 21.

(List continued on next page.)

Primary Examiner—Arun S. Phasge
Attorney, Agent, or Firm—Wolf, Greenfield & Sacks, P.C.

[57] ABSTRACT

An improved electrodeionization apparatus and method are provided. The electrodeionization apparatus includes an ion-concentrating compartment, an ion-depleting compartment, and electrolyte compartments, wherein alternating layers of anion exchange resins and cation exchange resins are positioned in the ion-depleting compartment, and the anion exchange resins comprise Type II anion resins. The incorporation of Type II anion material, alone or with Type I anion material, in anion permeable membranes and/or resins improves the electric current distribution, degree of resin regeneration, and deionization performance.

44 Claims, 6 Drawing Sheets

U.S. PATENT DOCUMENTS

| | | | |
|---|---|---|---|
| 2,815,320 | 12/1957 | Kollsman | 204/180 |
| 2,923,674 | 2/1960 | Kressman | 204/180 |
| 3,149,061 | 9/1964 | Parsi | 204/180 |
| 3,291,713 | 12/1966 | Parsi | 204/180 |
| 3,375,208 | 3/1968 | Duddy | 260/2.1 |
| 3,686,089 | 8/1972 | Korngold | 204/180 |
| 3,755,135 | 8/1973 | Johnson | 204/180 |
| 3,869,376 | 3/1975 | Tejeda | 204/301 |
| 3,989,615 | 11/1976 | Kiga et al. | 204/252 |
| 4,032,452 | 6/1977 | Davis | 210/243 |
| 4,033,850 | 7/1977 | Kedem et al. | 204/301 |
| 4,089,758 | 5/1978 | McAloon | 204/98 |
| 4,130,473 | 12/1978 | Eddleman | 204/252 |
| 4,216,073 | 8/1980 | Goldstein | 204/296 |
| 4,226,688 | 10/1980 | Kedem et al. | 204/180 |
| 4,298,442 | 11/1981 | Giuffrida | 204/180 |
| 4,430,226 | 2/1984 | Hedge et al. | 210/638 |
| 4,465,573 | 8/1984 | O'Hare | 204/180 |
| 4,473,450 | 9/1984 | Nayak et al. | 204/147 |
| 4,505,797 | 3/1985 | Hodgdon et al. | 204/252 |
| 4,632,745 | 12/1986 | Guiffrida et al. | 204/301 |
| 4,636,296 | 1/1987 | Kunz | 204/182.5 |
| 4,671,863 | 6/1987 | Teieda | 204/266 |
| 4,687,561 | 8/1987 | Kunz | 204/182.5 |
| 4,707,240 | 11/1987 | Parsi et al. | 204/290 F |
| 4,747,929 | 5/1988 | Siu et al. | 204/301 |
| 4,747,955 | 5/1988 | Kunin | 210/679 |
| 4,753,681 | 6/1988 | Giuffrida et al. | 134/22.17 |
| 4,804,451 | 2/1989 | Palmer | 204/301 |
| 4,925,541 | 5/1990 | Giuffrida et al. | 204/182.5 |
| 4,931,160 | 6/1990 | Giuffrida | 204/301 |
| 4,956,071 | 9/1990 | Giuffrida et al. | 204/301 |
| 4,983,267 | 1/1991 | Moeglich et al. | 204/182.4 |
| 5,026,465 | 6/1991 | Katz et al. | 204/182.4 |
| 5,066,375 | 11/1991 | Parsi et al. | 204/182.4 |
| 5,084,148 | 1/1992 | Kazcur et al. | 204/95 |
| 5,092,970 | 3/1992 | Kaczur et al. | 204/98 |
| 5,106,465 | 4/1992 | Kaczur et al. | 204/98 |
| 5,116,509 | 5/1992 | White | 210/64 |
| 5,120,416 | 6/1992 | Parsi et al. | 204/182.4 |
| 5,154,809 | 10/1992 | Oren et al. | 204/182.4 |
| 5,196,115 | 3/1993 | Andelman | 210/198.2 |
| 5,203,976 | 4/1993 | Parsi et al. | 204/182.4 |
| 5,211,823 | 5/1993 | Giuffrida et al. | 204/182.4 |
| 5,223,103 | 6/1993 | Kazcur et al. | 204/95 |
| 5,240,579 | 8/1993 | Kedem | 204/182.4 |
| 5,254,227 | 10/1993 | Cawlfield et al. | 204/131 |
| 5,292,422 | 3/1994 | Liang et al. | 204/301 |
| 5,308,466 | 5/1994 | Ganzi et al. | 204/151 |
| 5,316,637 | 5/1994 | Ganzi et al. | 204/182.4 |
| 5,346,624 | 9/1994 | Libutti et al. | 210/679 |
| 5,356,849 | 10/1994 | Matviya et al. | 502/180 |
| 5,376,253 | 12/1994 | Rychen et al. | 204/301 |
| 5,434,020 | 7/1995 | Cooper | 429/210 |
| 5,444,031 | 8/1995 | Hayden | 502/180 |
| 5,451,309 | 9/1995 | Bell | 204/301 |
| 5,458,787 | 10/1995 | Rosin et al. | 210/719 |
| 5,460,725 | 10/1995 | Stringfield | 210/690 |
| 5,460,728 | 10/1995 | Klomp et al. | 210/698 |
| 5,489,370 | 2/1996 | Lomasney et al. | 204/627 |
| 5,503,729 | 4/1996 | Batchelder et al. | 204/630 |
| 5,518,626 | 5/1996 | Birbara et al. | 210/670 |
| 5,518,627 | 5/1996 | Tomoi et al. | 210/682 |
| 5,538,611 | 7/1996 | Otawa | 204/550 |
| 5,538,655 | 7/1996 | Fauteux et al. | 252/62.2 |
| 5,593,563 | 1/1997 | Denoncourt et al. | 204/524 |
| 5,679,228 | 10/1997 | Batchelder et al. | 204/524 |
| 5,679,229 | 10/1997 | Goldstein et al. | 204/524 |

OTHER PUBLICATIONS

Walters et al., Concentration of Radioactive Aqueous Wastes, Jan. 1955, pp. 61–67, Industrial and Engineering Chemistry.

Warshawsky et al., Thermally Regenerable Polymerable Polymeric Crown Ethers. II Synthesis and Application in Electrodialysis, pp. 579–584.

Kedem et al., EDS—Sealed Cell Electrodialysis, 1983, pp. 291–299, Desalination 46.

Purolite Technical Bulletin, Hyperson–Macronet™ Sorbent Resins, 1995.

Simons, The Origin and Eliminaton of Water Splititng in Ion Exchange Membranes During Water Demineralisation by Electrodialysis, Jan. 29, 1979, pp. 41–42, Desalination, 28.

DiMascio et al., Electrodiaresis Polishing (an Electrochemical Deionization Process), pp. 164–172.

Dow Chemica Bulletin, DOWEX 11 Type Anion Resin.

Dow Chemical Bulletin, DOWEX Marathon C Cation Resin.

Korngold, Electrodialysis Processes Using Ion Exchange Resins Between Membranes, 1975, pp. 225–233, Desalinaton, 16.

Kedem et al., Reduction of Polarization by Ion–Conduction Spacers: Theoretical Evaluation of a Model System, 1978, pp. 143–156, Desalination, 27.

Farmer et al., Capacitive Deionization with Carbon Aerogel Electrodes, Strategic Environmental Research and Development Program SERDP Project No. 436–94.

Hobro et al., Recycling of Chromium from Metal Finishing Waste Waters Using Electrochemical Ion Exchange (EIX), pp. 173–183, 1994.

Shaposhnik et al., Demineraliztion of Water by Electrodialysis with Ion–Exchanger Packing Between the Membranes, Jul. 12, 1971, pp. 2815–2818, Voronezh Technoligical Institute.

Sammon et al., An Experimental Study of Electrodeionisation and its Application to the Treatment of Radioactive Wastes, Jun. 1960, Chemistry Division, U.K.A.E.A. Research Group, Atomic Energy Research Establishment, Harwell.

Capacitive Deionization of $NH_4C1O_4$ solutions with carbon aerogel electrodes, Farmer, et al., J. Appl. Electrochemistry, 26 (1996). 1007–1018.

○ CATION RESIN
⊖ ANION RESIN (TYPE I)

○ CATION RESIN
⊖ ANION RESIN (TYPE I)

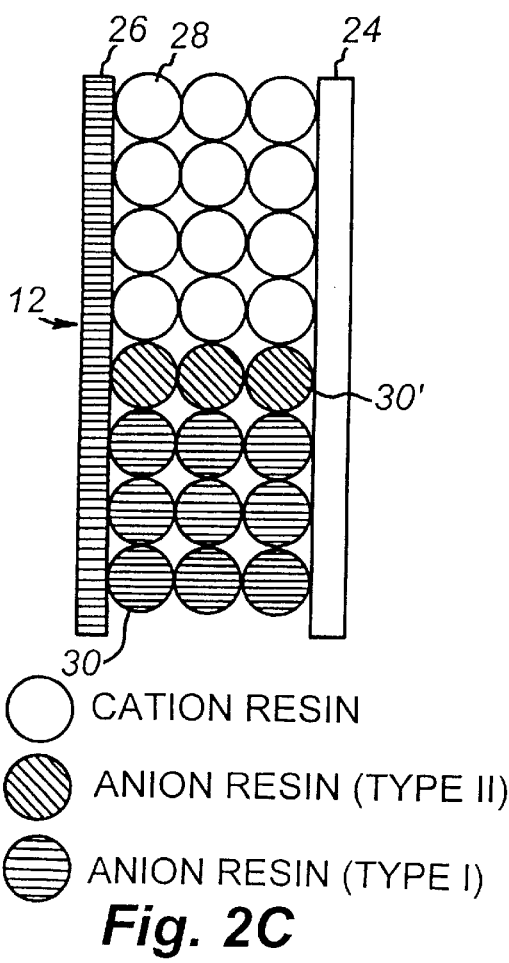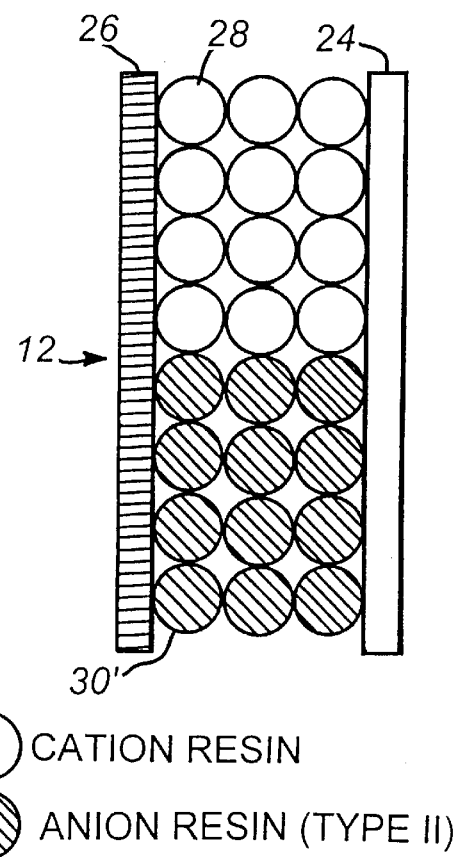
Fig. 2C
Fig. 2D

ELECTRODEIONIZATION APPARATUS AND METHOD

This application is a continuation-in-part of U.S. patent application Ser. No. 08/717,781, filed Sep. 23, 1996.

BACKGROUND OF THE INVENTION

1. Field of the Invention:

The present invention relates to an electrodeionization apparatus and method and, more particularly, to an electrodeionization apparatus and method incorporating membrane and electroactive media combinations, including Type II anion material, solely or in combination with Type I anion material, to improve electric current distribution, degree of resin regeneration, and deionization performance.

2. Description of the Related Art:

Electrodeionization (EDI) is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices may comprise media of permanent or temporary charge, and may be operated batchwise, intermittently, or continuously. EDI devices may be operated to cause electrochemical reactions specifically designed to achieve or enhance performance, and may comprise electrically active membranes such as semipermeable ion exchange or bipolar membranes.

In continuous electrodeionization (CEDI), which includes processes such as continuous deionization, filled cell electrodialysis, or electrodiaresis (EDR), the ionic transport properties of the electrically active media are the primary sizing parameter. These processes are described, for example, by Kollsman in U.S. Pat. No. 2,815,320; Pearson in U.S. Pat. No. 2,794,777; Kressman in U.S. Pat. No. 2,923,674; Parsi U.S. Pat. Nos. 3,149,061 and 3,291,713; Korngold et al. in U.S. Pat. No. 3,686,089; Davis in U.S. Pat. No. 4,032,452; U.S. Pat. No. 3,869,376; O'Hare in U.S. Pat. No. 4,465,573; Kunz in U.S. Pat. Nos. 4,636,296 and 4,687,561; and Giuffrida et al. in U.S. Pat. No. 4,632,745.

A typical CEDI device comprises alternating electroactive semipermeable, anion and cation ion-exchange membranes. The spaces between the membranes are configured to create liquid flow compartments with inlets and outlets. A transverse DC electrical field is imposed by an external power source using electrodes at the bounds of the membranes and compartments. Often, electrolyte compartments are provided so that reaction products from the electrodes can be separated from the other flow compartments. Upon imposition of the electric field, ions in the liquid are attracted to their respective counterelectrodes. The compartments bounded by the electroactive anion membrane facing the anode and the electroactive cation membrane facing the cathode become ionically depleted, and the compartments bounded by the electroactive anion membrane facing the cathode and the electroactive cation membrane facing the anode become ionically concentrated. The volume within the ion-depleting compartments, and preferentially within the ion-concentrating compartments, is also comprised of electrically active media. In continuous deionization devices, the media may comprise intimately mixed anion and cation exchange resins. The ion-exchange media enhances the transport of ions within the compartments and can also participate as a substrate for controlled electrochemical reactions. The configuration is similar in EDR devices, except that the media comprise separate, and sometimes alternating, layers of ion-exchange resin. In these devices, each layer is substantially comprised of resins of the same polarity (either anion or cation resin) and the liquid to be deionized flows sequentially through the layers.

A number of CEDI devices and processes have been successfully commercialized, for example, as disclosed by Giuffrida in U.S. Pat. No. 4,298,442; Giuffrida et al. in U.S. Pat. No. 4,632,745; Siu et al. in U.S. Pat. No. 4,747,929; Palmer in U.S. Pat. No. 4,804,451; Giuffrida et al. in U.S. Pat. No. 4,925,541; Giuffrida U.S. Pat. Nos. 4,931,160 and 4,956,071; White in U.S. Pat. No. 5,116,509; Oren et al. in U.S. Pat. No. 5,154,809; Giuffrida et al. in U.S. Pat. No. 5,211,823; and Ganzi et al. in U.S. Pat. Nos. 5,308,466 and 5,316,637. In addition, there have been a wide range of devices described in the literature, including Walters et al., "Concentration of Radioactive Aqueous Wastes," Ind. Eng. Chem., Vol. 47, 1, pp. 61–67 (1955); Sammon et al., "An Experimental Study of Electrodeionization and Its Application to the Treatment of Radioactive Wastes," AERE-R3137, Chemistry Division, U.K. AEA Research Group, Atomic Energy Research Establishment, Harwell (June 1960); Glueckauf, "Electrodeionization Through a Packed Bed," British Chemical Engineering, pp. 646–651 (December, 1959); Matějka, "Continuous Production of High Purity Water by Electrodeionization," J. Appl. Chem. Biotechnol., Vol. 21, pp. 117–120 (April, 1971); Shaposhnik et al., "Demineralization of Water by Electrodialysis with Ion-Exchanger Packing Between the Membranes," Zhurnal Prikladnoi Khimii, Vol. 46, 12, pp. 2659–2663 (December, 1973); Korngold, "Electrodialysis Processes Using Ion Exchange Resins Between Membranes," Desalination, Vol. 16, No. 2, pp. 225–233 (1975); and Kedem et al., "Reduction of Polarization by Ion-Conduction Spacers," Desalination, Vol. 27, pp. 143–156 (1978).

There remains a need for devices and processes with improved reliability and the ability to operate under more rigorous conditions with reduced power consumption and reduced membrane area. Often, the limiting factor in the applicability of CEDI is the ability of the electroactive media within the device to withstand the temperature, chemical, and fouling conditions of the liquid to be processed. One difficulty in specifying such electroactive media results from the need in most applications to incorporate both anion and cation media within the compartments and the membranes. Many times, conditions are relatively benign for media of a given fixed charge, but are limited by the oppositely charged media. For example, the presence of iron in the liquid to be processed may result in fouling of cation exchange resin and membrane, but would not affect the performance of anion exchange resin or membrane. Conversely, the presence of high temperature, chlorine or intermediate molecular weight weak organic compounds may result in degradation, oxidation, or fouling of anion exchange resin and membrane, but would not affect the performance of cation exchange resin or membrane.

Performance of CEDI may further be limited by difficulty in obtaining the desired electrical current distribution with the device. Electroactive media of permanent charge may change their electrical resistance properties in undesired ways depending on their ionic form. For example, in the ion substitution of sodium with hydrogen ion in EDR, most cation exchange resin will preferentially transport hydrogen ion over the desired transport of sodium ion. This results in electrical inefficiencies and, under certain circumstances, may cause pH shifts that are detrimental to valuable products within the liquid. In another example, a given electroactive media may be desirable for transport properties, such as the Type II anion membrane and resins for continuous deionization and EDR, but may have the undesirable properties of catalyzing the ionization reaction of water to hydrogen and hydroxide ions.

Furthermore, the presence of gases, poor flow distribution, low temperature and/or low conductance liquids within the electrolyte compartments may be detrimental to electrical current distribution, thereby reducing the efficiency of deionization. However, as a result of the oxidizing or reducing conditions common within the electrolyte compartments, standard electroactive media such as ion exchange resins or activated carbons (e.g. carbons prepared by pyrolyzing coal into small imperfect granulars having an interfacial area on the order of 10 $m^2$/g and contain up to 20% ash impurities) cannot be incorporated within the electrolyte compartments because of their limited chemical resistance.

In electrochemical ion exchange (EIX) and capacitive deionization (CapDI), both the transport and the capacity of the electroactive media are important sizing parameters. In EIX, the electrode reactions produce ions that are used for ionic substitution reactions within the electroactive media. Typical EIX devices, as described, for example, by Hobro et al. in "Recycling of Chromium from Metal Finishing Waste Waters Using Electrochemical Ion Exchange," Electrochemical Society, Symposium on Water Purification, PV94-19, pp. 173–183 (1994), may or may not comprise ion exchange membranes. Similar to the CEDI processes, the performance of the EIX devices are often limited by use of permanently charged media, media of limited temperature and/or chemical resistance, and/or media with undesirable ion transport properties. In CapDI, high surface area, usually carbon type electrodes are used to adsorb ions as polarity is imposed, and then desorb ions as the electric field is removed or reversed. As with other processes, typical CapDI devices may also be limited by the use of electrodes of low chemical resistance, or limitations of the media to act equally well or in the desired manner when in use as both a cation and anion adsorber or as both an ion adsorber and desorber.

Therefore, a need remains for an improved electrodeionization apparatus having improved electric current distribution, degree of resin regeneration, and deionization performance. Moreover, there is a need for an electrodeionization apparatus which promotes or limits electrochemical water dissociation depending on its chemical environment. Lastly, there is a need to provide improved methods of operation of an electrodeionization apparatus.

SUMMARY OF THE INVENTION

Accordingly, the present invention is directed to an electrodeionization apparatus including an ion-concentrating compartment, an ion-depleting compartment, and electrolyte compartments, wherein alternating layers of anion exchange resins and cation exchange resins are positioned in the ion-depleting compartment, and the anion exchange resins comprise Type II anion resins, alone or in combination with Type I anion resins.

In another aspect of the present invention, an electrodeionization apparatus is provided including an ion-concentrating compartment, an ion-depleting compartment, and electrolyte compartments, wherein the compartments are divided by at least one anion or cation permeable membrane, and the anion permeable membrane comprises Type II anion material, alone or in combination with Type I anion resin material.

In another aspect of the present invention, an electrodeionization apparatus is provided including an ion-concentrating compartment, an ion-depleting compartment, and electrolyte compartments, wherein an inert material layer is positioned between alternating layers of anion exchange resins and cation exchange resins. The anion exchange resins comprise Type II anion resins, alone or in combination with Type I anion resins. The inert layer eliminates the bipolar interface between layers of cation and anion exchange resins and forces water dissociation to occur at the membrane resin interface.

In another aspect of the present invention, a method for purifying water in an electrodeionization apparatus having an ion-concentrating comparting, an ion-depleting compartment, and electrolyte compartments includes filling the ion-concentrating compartment with cation exchange resin, and filling the ion-depleting compartment with alternating layers of cation and anion exchange resins, wherein the anion exchange resins comprise Type II anion resins, alone or in combination with Type I anion resins. The method further includes passing a water stream through the ion-depleting compartment, and applying electric field across the electrolyte compartments positioned at opposite ends of the electrodeionization apparatus.

All combinations and permutations of the electroactive media and operational methods are available for practice in various liquid deionization applications as the need arises. For example, the electrodeionization apparatus and method of the present invention can be applied to processes that are presently not practically feasible due to lack of scaling and fouling resistance, temperature resistance, chemical resistance, or electrical efficiency. Typical applications would be the purification and softening of relatively untreated municipal water, relatively untreated well water and brackish water, and water containing foulants such as polyelectrolytes, tannins, lignins, fulvic acid, and other polar or weakly ionized or large ionized organic compounds, foulants such as iron, sulfide, phosphates, silicates, and other multivalent ions. Other applications would be in the treatment and processing of foods and beverages, sugars and various sugar fractionations and chemical modifications, starches, milk and milk by-products, by-products from cheese manufacture such as whey, purification and fractionation of proteins, products of various fermentation processes such as alcoholic beverages, pharmaceutical products and the like, processes in the chemical, pharmaceutical, food and beverage industries requiring ion substitutions in the presence of foulants and chemical oxidants, mixed solutes in low level radioactive waste streams, waste water streams containing heavy metals and organic compounds, and liquids in industries such as the food and beverage, chemical, pharmaceutical, power, and chemical industries where operation at elevated temperatures are required, or where sterilization or sanitization by heat or chemical oxidants is required.

BRIEF DESCRIPTION OF THE DRAWINGS

Preferred, non-limiting embodiments of the present invention will be described by way of example with reference to the accompanying drawings, in which:

FIG. 2C is a schematic, cross-sectional view through an ion-depleting cell in an electrodeionization apparatus, illustrating another configuration of the cation and anion resin layers within the cell;

FIG. 2D is a schematic, cross-sectional view through an ion-depleting cell in an electrodeionization apparatus, illustrating another configuration of the cation and anion resin layers within the cell;

DETAILED DESCRIPTION OF THE INVENTION

The present invention is directed to an electrodeionization apparatus and method which provides high purity water with low electrical resistance by controlling the majority of water dissociation so that it occurs at the membrane/resin interface and at a low electrical potential. The electrodeionization apparatus has improved electric current distribution, degree of resin regeneration, and deionization performance, and can promote or limit electrochemical water splitting depending on its chemical environment. An electrodeionization apparatus may be based on technologies such as continuous electrodeionization, electrodiaresis, filled-cell electrodialysis, electrochemical ion exchange, capacitive deionization, and the like. For the purposes of the present invention, the electrodeionization apparatus is an EDR apparatus, such as those disclosed by Kunz, in U.S. Pat. Nos. 4,636,296 and 4,687,561, both of which are incorporated herein by reference. Moreover, the electrodeionization apparatus may be based on various configurations, such as a spiral design, a plate and frame design, and a circular design.

Figure 1:
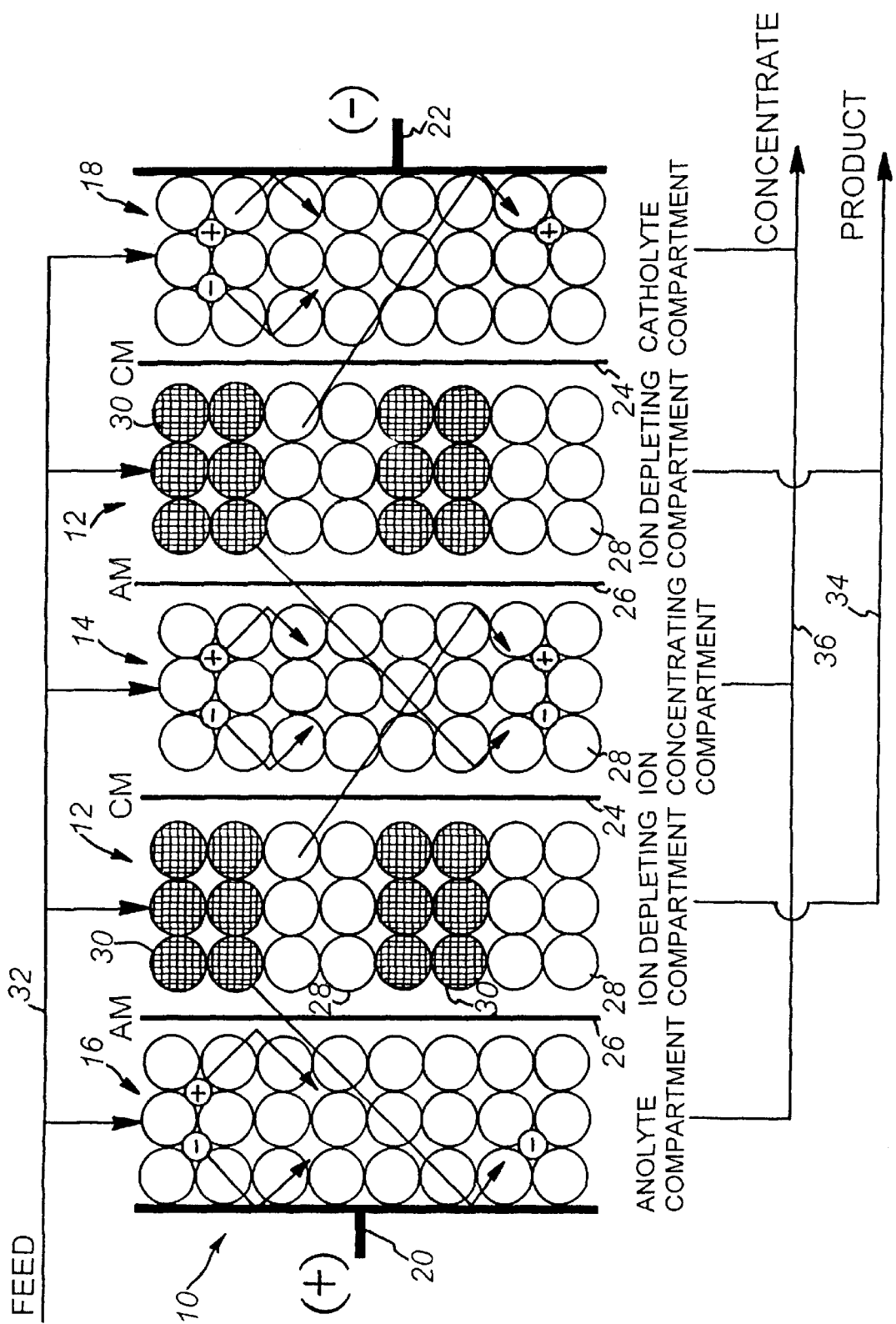
FIG. 1 is a schematic, sectional view through an electrodeionization apparatus, illustrating the fluid and ion flow direction through an ion-depleting, ion-concentrating, and electrolyte compartments.

In FIG. 1, a schematic, cross-sectional view of the fluid and ion flow paths through one embodiment of an EDR apparatus of the present invention is shown. The EDR module 10 includes ion-depleting compartments 12 and an ion-concentrating compartment 14 positioned between the ion-depleting compartments. The ion-depleting compartments are bordered by an anolyte compartment 16 and a catholyte compartment 18. Typically, end blocks are positioned adjacent to end plates (not shown) to house an anode 20 and a cathode 22 in their respective compartments. The compartments include cation-selective membranes 24 and anion-selective membranes 26, which are typically sealed to the periphery of both sides of the compartments. The cation- and anion-selective membranes are typically heterogeneous polyolefin-based membranes, which are typically extruded by a thermoplastic process using heat and pressure to create a composite sheet of constant thickness. The cation-selective membranes and anion-selective membranes are typically comprised of an ion exchange powder, a polyethylene powder binder, and a glycerin lubricant. The ion exchange powders are readily available; for example, a cation exchange powder is commercially available as PUROLITE™ C-100IP sodium resonium powder, and an anion exchange powder is commercially available as PUROLITE™ A-430IP cholestyramine powder (trademarks of Purolite Company, Bala Cynwyd, Pa.). As known to those skilled in the art, the membranes are formed by mixing the raw materials, and forming and extruding pellets made from the materials into composite sheets.

Electroactive media is housed within a central space formed between the ion-permeable membranes 24 and 26. The ion-concentrating compartment is filled with cation exchange resins 28, and the ion-depleting compartments are filled with alternating layers of cation exchange resins 28 and anion exchange resins 30. Typically, there are at least two layers in the ion-depleting compartment (a cation resin layer and an anion resin layer); the number of layers in the ion-depleting compartment is determined by the height of the module frame, such that the thickness of each cation or anion resin layer is adequate to reduce shifting and undesired mixing of the alternating layers of resins during use. Therefore, although as few as two alternating resin layers can be used in the ion-depleting compartment, up to eight or more resin layers are typically used. In addition, in an alternative embodiment of the present invention, the ion-concentrating compartment may also be filled with alternating layers of cation exchange resins and anion exchange resins (not shown). The arrangement of alternating layers in the ion-concentrating compartment, in addition to the alternating layers in the ion-depleting compartment, would eliminate a direct path of current flow from electrode to electrode through the cation resin (which typically has lower electrical resistance than anion resin) and enhance the uniformity of the electric current distribution throughout the module.

In operation, a liquid to be purified 32, which may be a reverse osmosis product stream, typically having dissolved cationic and anionic components, is fed through the ion-depleting compartments 12, wherein the cationic components are attracted to the cation exchange resin 28 and the anionic components are attracted to the anion exchange resin 30. An electric field is then applied across the anode 20 and cathode 22 at the opposite ends of the module. The electric current passes perpendicularly to the fluid flow such that the dissolved cationic and anionic components migrate from the alternating ion exchange resin layers in the direction of their corresponding electrode. Cationic components migrate through the cation-selective membrane 24 into the adjacent ion-concentrating compartment 14. An anion-selective membrane on the opposite side of the ion-concentrating compartment prevents further migration, thereby trapping the cationic components in the ion-concentrating compartment. The process for the anionic components is similar but occurs in the opposite direction; anionic components migrate through the anion-selective membrane 26 into the ion-concentrating compartment 14 and a cation-selective membrane 24 on the other side of the ion-concentrating compartment prevents further migration to trap the anionic components in the ion-concentrating compartment. Ionic components are depleted from the ion-depleting compartments 12 and increased in the ion-concentrating compartments 14, forming a high purity product stream 34 and a concentrate stream 36.

During the flow of current in the EDR module 10, a polarization phenomena occurs which leads to the dissociation of water into hydrogen and hydroxyl ions. The hydrogen and hydroxyl ions regenerate the ion exchange resins in the ion-depleting compartments 12 so that removal of dissolved ionic components can occur continuously and without a separate step for regenerating the exhausted ion exchange resins. Although the dissociation of water occurs at various locations within the module 10, it preferentially occurs at the bipolar interfaces in the module, where cation exchange material contacts anion exchange material in the ion-depleting compartment where localized conditions of low solute are most likely to occur. As shown in FIGS. 3A–3F, in several configurations of cation and anion resin layers within an ion-depleting compartment, the two primary areas of bipolar interfaces in the EDR device are where resin contacts membrane, referred to as the resin/membrane interface (including both the cation membrane/anion resin and anion membrane/cation resin interfaces), and where the resin contacts resin, referred to as the resin/resin interface. As noted, the resin/membrane interface is perpendicular to the current flow and the contact is between a flat heterogeneous membrane that is about 50 percent active, and spherical resin beads with about 100 percent active surface area. It is noted that if a majority of the water dissociation occurs at the resin/membrane interface, the maximum amount of resin in the ion-depleting compartment will be regenerated.

The second area in the module where a bipolar interface exists is the resin/resin interface. This area is located between each cation exchange resin and anion exchange resin layer. The resin/resin interface is parallel to the current flow and represents about 12 percent of the total bipolar interface within the module. The contact is between spherical anion and cation beads that have 100 percent active surface areas. This area may provide the path of least electrical resistance, allowing the majority of current to travel therethrough. Because water dissociation occurs where the current travels, the majority of water dissociation therefore may occur at the resin/resin interface, thereby regenerating only those resins that surround this interface. Therefore, only a small portion of the resin bed is used, resulting in lower product quality and a lower buffering capacity for fluctuations in feed water.

The electroactive media utilized in the ion-depleting compartment 12 can include a quantity of anion resin materials having weak base functional groups in their surface regions, such as tertiary alkyl amino groups, or anion resin materials containing Type II functional groups in their surface regions, for example dimethyl ethanolamine. These materials can also be used in combination with anion exchange resin materials containing Type I functional groups (quaternary ammonium groups) in their surface regions. As disclosed by Simons in "The Origin and Elimination of Water Splitting in Ion Exchange Membranes During Water Demineralization by Electrodialysis," *Desalination,* 28 (1979) 41–42, at current values above the limiting current, water will only dissociate at the interfaces between oppositely charged materials when the anion material contains weak base groups in the surface regions, such as tertiary alkyl amino groups. These materials are commercially available, for example, as DOWEX™ WBA anion resins (trademark of Dow Chemical Company, Midland, Mich.). Additionally, anion materials containing Type II functional groups in the surface regions, for example dimethyl ethanol amine, can be used with or instead of materials having weak base groups. These materials are commercially available, for example, as AMBERJET™ 4600 Type II anion resins (trademark of Rohm & Haas Corporation, Philadelphia, Pa.), and DOWEX™ SAR Type II anion resins (trademark of Dow Chemical Company, Midland, Mich.). It has now been found that the use of anion exchange material containing Type II functional groups or weak base functional groups can control the location of where water dissociation occurs, since these groups dissociate water at higher rates than Type I functional groups. The Type II and weak base groups act as catalysts, where they increase the rate of water dissociation by modifying the reaction pathway or the nature of the activated complex so that the reaction may proceed through an activated complex with lower activation energy.

Water dissociation will not occur with anion resin materials containing Type I functional groups (quaternary ammonium groups) in their surface regions unless the quaternary ammonium groups are oxidized to tertiary alkyl amine groups, as follows:

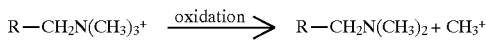

The tertiary alkyl amine then undergoes a protonation reaction, forming a protonized tertiary alkyl amine and a hydroxyl ion.

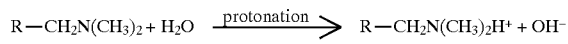

The $R$—$CH_2N(CH_3)_2H^+$ is then reacted, forming a tertiary alkyl amine and a hydrogen ion.

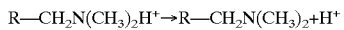

The overall reaction is the dissociation of water. It is noted that under the flow of current, the oxidation of dimethyl ethanolamine functional groups will occur at a faster rate than the oxidation of the quaternary ammonium functional groups, resulting in water dissociation at a lower electrical potential.

The present invention will be further illustrated by the following examples, which are intended to be illustrative in nature and are not to be considered as limiting the scope of the invention.

EXAMPLES

The following examples used compact continuous deionization EDR module. A reverse osmosis permeate stream at a conductivity of about 5.0 µS/cm, at a temperature of about 20° C., was used as the feed in each example. The modules were operated at a flow rate of about 1.0 lpm/cell-pair, with a product recovery of about 80 percent. The applied DC amperage to the module was 0.5 A, which corresponded to a current density of about 10 mA/cm$^2$. The DC voltage was recorded after the forty-eighth hour of operation. The electrical resistance was calculated using Ohm's law and the percentage of current passing across the interfaces was determined by assuming that the arrangement of the alternating layers in the ion-depleting compartment behaves as resistors in parallel.

Throughout the examples, the in-line conductivity measurements were made with a 832 digital resistivity indicator (available from Thorton, Waltham, Mass.), the water temperature was measured with a GT-300 in-line thermometer (available from Tel-Tru Manufacturing Co., Rochester, N.Y.), and the water flow rates were measured with a 0.4 to 4.0 lpm flow meter (available from Blue White, Westminster, Calif.). Power was supplied to the modules with a constant voltage/amperage power supply (available from BK Precision, Chicago, Ill.).

Example I

The areas where water splitting occurs in the EDR module were evaluated with various combinations of resin/resin and membrane/resin bipolar interfaces.

Six two-cell-pair modules (module 1–6) with various bipolar interfaces were assembled by layering a measured volume of DOWEX™ MARATHON™ C cation resins, and MARATHON™ A and MARATHON™ A2 anion resins (trademarks of Dow Chemical Company, Midland, Mich.). DOWEX™ MARATHON™ C cation resin is a gel-type strong acid cation exchange resin with sulfonic acid functional groups. DOWEX™ MARATHON™ A is a gel-type strong base Type I anion exchange resin with quaternary ammonium functional groups. DOWEX™ MARATHON™ A2 is a gel-type strong base Type II anion exchange resin with dimethyl ethanolamine functional groups.

Figure 2A:
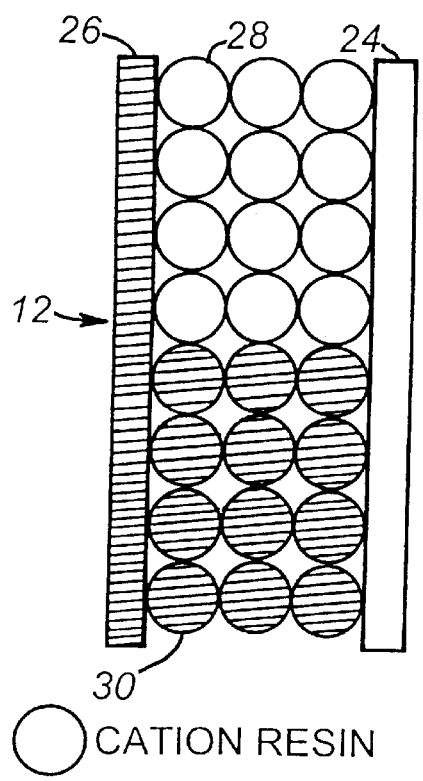
FIG. 2A is a schematic, cross-sectional view through an ion-depleting cell in an electrodeionization apparatus, illustrating one configuration of the cation and anion resin layers within the cell.
Figure 2B:
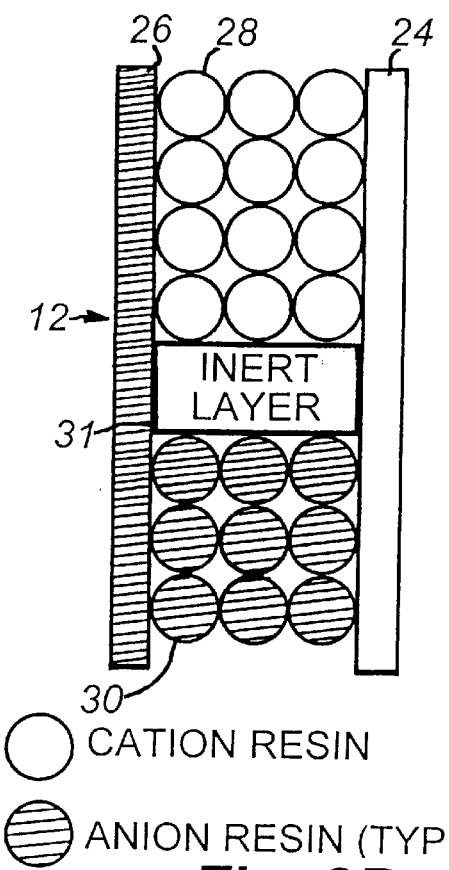
FIG. 2B is a schematic, cross-sectional view through an ion-depleting cell in an electrodeionization apparatus, illustrating another configuration of the cation and anion resin layers within the cell.
Figure 2E:
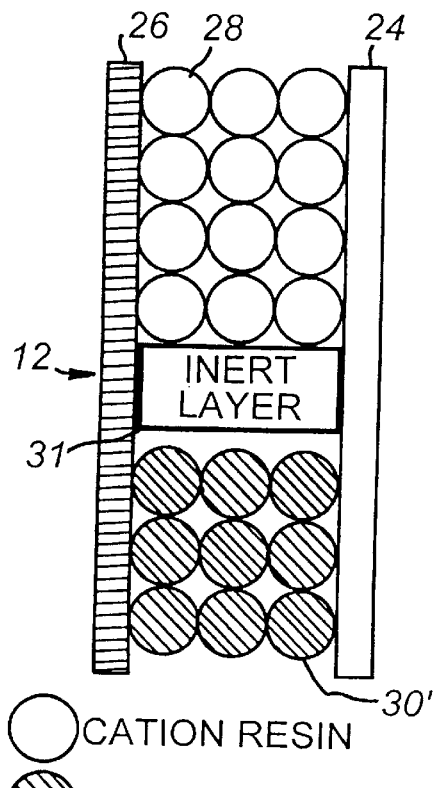
FIG. 2E is a schematic, cross-sectional view through an ion-depleting cell in an electrodeionization apparatus, illustrating another configuration of the cation and anion resin layers within the cell.
Figure 2F:
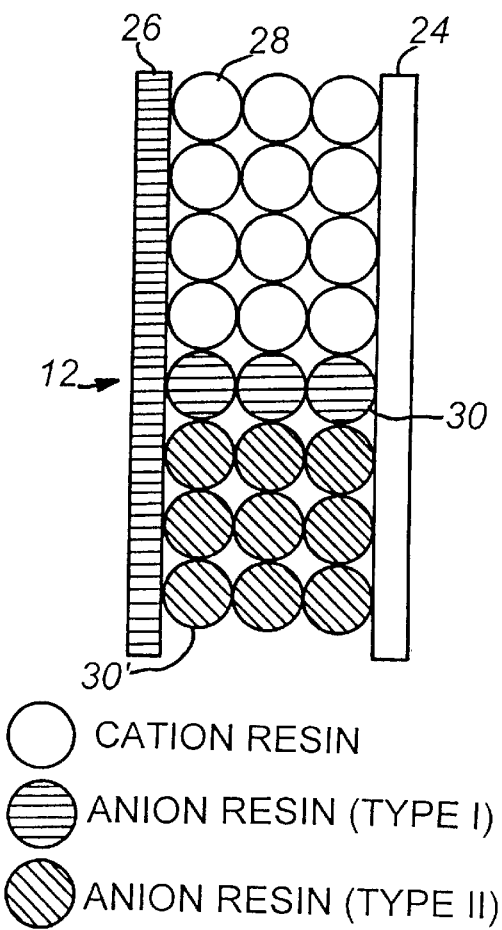
FIG. 2F is a schematic, cross-sectional view through an ion-depleting cell in an electrodeionization apparatus, illustrating another configuration of the cation and anion resin layers within the cell.
Figure 3A:
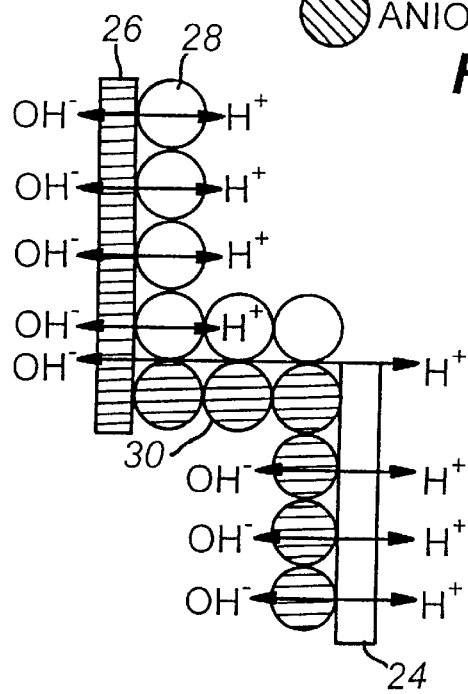
FIG. 3A is a schematic, partial sectional view through the electrodeionization apparatus cell shown in FIG. 2A, illustrating the bipolar interfaces within the cell and the movement of ions in the direction of corresponding electrodes.
Figure 3B:
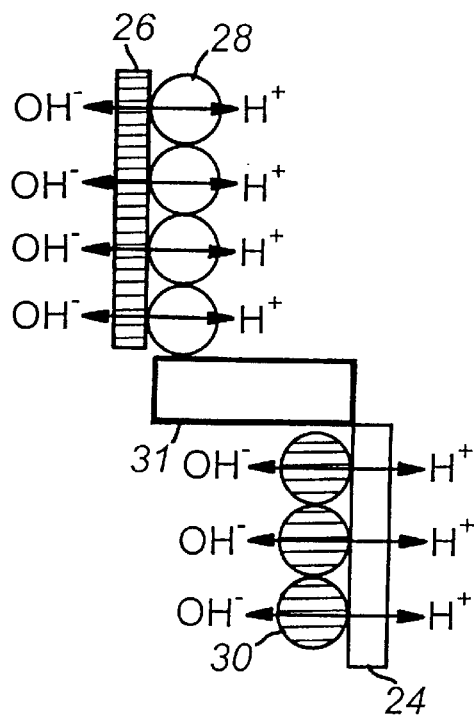
FIG. 3B is a schematic, partial sectional view through the electrodeionization apparatus cell shown in FIG. 2B, illustrating the bipolar interfaces within the cell and the movement of ions in the direction of corresponding electrodes.
Figure 3C:
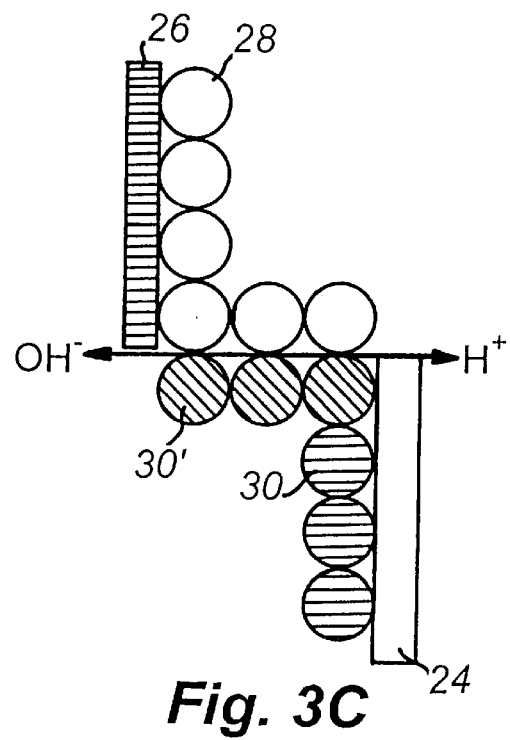
FIG. 3C is a schematic, partial sectional view through the electrodeionization apparatus cell shown in FIG. 2C, illustrating the bipolar interfaces within the cell and the movement of ions in the direction of corresponding electrodes.
Figure 3D:
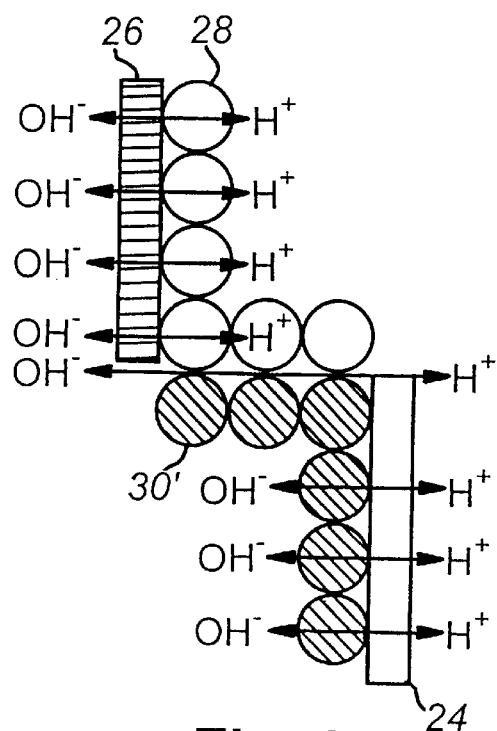
FIG. 3D is a schematic, partial sectional view through the electrodeionization apparatus cell shown in FIG. 2D, illustrating the bipolar interfaces within the cell and the movement of ions in the direction of corresponding electrodes.
Figure 3E:
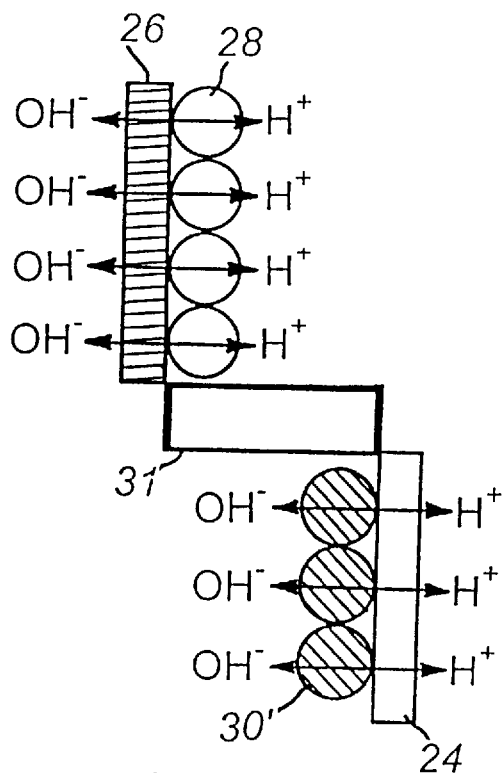
FIG. 3E is a schematic, partial sectional view through the electrodeionization apparatus cell shown in FIG. 2E, illustrating the bipolar interfaces within the cell and the movement of ions in the direction of corresponding electrodes.
Figure 3F:
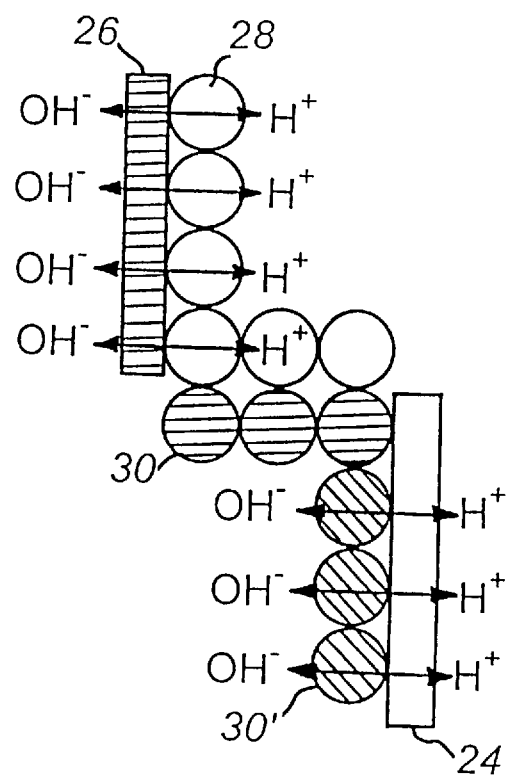
FIG. 3F is a schematic, partial sectional view through the electrodeionization apparatus cell shown in FIG. 2F, illustrating the bipolar interfaces within the cell and the movement of ions in the direction of corresponding electrodes.

Module 1 used layered Type I anion 30 and cation exchange resins 28 between cation-selective membrane 24 and anion-selective membrane 26 in ion-depleting cell 12, as shown for example in FIG. 2A. Module 2 used layered Type I anion and cation exchange resins, with an inert layer 31 placed between the exchange resins in ion-depleting cell 12, as shown for example in FIG. 2B. The inert layer 31 may be formed from any inert material which does not conduct current or take part in water dissociation, while permitting fluid flow to pass through the ion-depleting cell. The inert layer eliminates the bipolar resin/resin interface between resin layers and forces water dissociation to occur at the bipolar membrane/resin interface, where a majority of the resins become regenerated. For example, the inert layer 31 may be formed from a thin plastic flow distributor, a plastic mesh screen, an expanded plastic sheet with openings sufficiently small to prevent a resin/resin interface from forming inert resin beads, and the like. Module 3 used layered Type I anion and cation exchange resins, with a Type II anion resin layer 30' placed between the exchange resins in ion-depleting cell 12, as shown for example in FIG. 2C. Module 4 used layered Type II anion 30' and cation exchange resins 28 between the ion-permeable membranes 24, 26 in the ion-depleting cell 12, as shown for example in FIG. 2D. Module 5 used layered Type II anion 30' and cation exchange resins 28 with an inert layer placed between the exchange resins in ion-depleting cell 12, as shown for example in FIG. 2E. Module 6 used layered Type II anion 30' and cation exchange resins 28, with a Type I anion resin layer 30 placed between the exchange resins in ion-depleting cell 12, as shown for example in FIG. 2F. As noted above, the bipolar interfaces in each module, where the majority of water dissociation is expected to occur, are respectively illustrated in FIGS. 3A–3F.

The performance of each of the configurations was evaluated with regard to the product resistivity and the DC voltage, recorded after forty-eight hours of operation, and the percentage of the current passing across the membrane/resin interface, is reported in Table 1 below.

TABLE 1

| Module | Product Resistivity (MΩ-cm) | Voltage | Current Passing Across Membrane/Resin Interface (%) |
|---|---|---|---|
| 1 | 2.69 | 135 | 90.2 |
| 2 | 4.19 | 164 | >99.0 |
| 3 | 8.84 | 17 | 11.2 |
| 4 | 15.4 | 23 | 37.7 |
| 5 | 11.4 | 50 | >99.0 |
| 6 | 17.3 | 54 | >99.0 |

As reported in Table 1, Module 1, wherein 100% of the bipolar surfaces consisted of cation and Type I anion resins, approximately 90% of the current passed through the membrane/resin interface, indicating that the total resin/resin interface has a higher electrical resistance than the membrane/resin interface. Module 1 also has the second highest reported electrical potential (135 V at 0.5 A), confirming poor water dissociation ability of the Type I anion resin.

The highest electrical potential (164 V at 0.5 A) was measured in Module 2, which used an inert layer between the cation and Type I anion resin layers, and wherein all of the current passed through the membrane/resin interface. The increase in voltage in Module 2 was the result of the additional amount of current that was passing through the membrane/resin interface, and may have also included the presence of the inert material.

The addition of Type II anion resin between the cation and Type I anion resin layers in Module 3 decreased the cation and Type I anion resin bipolar interface to about 88%. The current passing through the membrane/resin interface was 11%, indicating that the resin/resin interface had a lower electrical resistance than the membrane/resin interface, due to the Type II resin functional groups which dissociate water at lower electrical potential.

In Module 4, cation and Type II anion resins were used, however because the anion membranes are made with Type I anion material, only about 71% of the bipolar surfaces consisted of the cation and Type II anion resins. About 38% of the current passed through the membrane/resin interface, and Module 4 had the second lowest electrical potential (23 V at 0.5 A). Module 5 used an inert layer between the cation and Type II anion resin layers, and the voltage increased as all of the current passed through the membrane/resin interface. In Module 6, all of the current was forced through the membrane/resin interface because the Type I anion resin was placed between the cation and Type II anion resin layers, thereby confirming the excellent water dissociation ability of the Type II anion resin.

Therefore, to obtain the highest purity water with the lowest electrical resistance the majority of the water dissociation preferably occurs at the membrane/resin interface and at low electrical potential. The resin/resin water dissociation results in less than optimal electric current distribution and inefficient distribution of hydrogen and hydroxide ions. The experimental results indicate that water dissociation at the anion membrane/cation resin and cation membrane/anion resin interfaces can be controlled by relative bed depth and by the interfacial chemical makeup of the resins and membranes. The Type II anion material, alone or with Type I anion resin material, used in the membranes and/or resins provides the optimum performance of the EDR module.

Although particular embodiments of the invention have been described in detail for purposes of illustration, various changes and modifications may be made without departing from the scope and spirit of the invention. Accordingly, the invention is not to be limited except as by the appended claims.

What is claimed is:

1. An electrodeionization apparatus, comprising:
   an ion-concentrating compartment;
   an ion-depleting compartment; and
   an anode and a cathode;
   wherein alternating layers of anion exchange resins and cation exchange resins are positioned in said ion-depleting compartment, and said layers of anion exchange resins and cation exchange resins are separated by an intermediate material layer, and said anion exchange resins comprise Type II anion resin material.

2. The electrodeionization apparatus of claim 1, wherein said intermediate material layer is a Type I anion exchange resin material layer positioned between said alternating layers of anion exchange resins and cation exchange resins.

3. The electrodeionization apparatus of claim 2, wherein said compartments are divided by at least one anion or cation permeable membrane, and said at least one anion permeable membrane comprises Type II anion exchange resins.

4. The electrodeionization apparatus of claim 1, wherein said intermediate material layer is an inert material layer positioned between said alternating layers of anion exchange resins and cation exchange resins.

5. The electrodeionization apparatus of claim 4, wherein said compartments are divided by at least one anion or cation permeable membrane, and said at least one anion permeable membrane comprises Type II anion exchange resins.

6. The electrodeionization apparatus of claim 1, wherein said compartments are divided by at least one anion or cation permeable membrane, and said at least one anion permeable membrane comprises Type II anion exchange resins.

7. The electrodeionization apparatus of claim 1, wherein said anion exchange resins further include anion exchange resins selected from the group consisting of Type II anion exchange resins, anion exchange resins with weak base surface groups, and mixtures thereof.

8. The electrodeionization apparatus of claim 1, further comprising an anolyte compartment and a catholyte compartment.

9. The electrodeionization apparatus of claim 1, further comprising alternating layers of cation exchange resins and anion exchange resins positioned within said ion-concentrating compartment.

10. The electrodeionization apparatus of claim 9, further comprising a Type I anion exchange resin material layer positioned between said alternating layers of anion exchange resins and cation exchange resins.

11. The electrodeionization apparatus of claim 10, wherein said compartments are divided by at least one anion or cation permeable membrane, and said at least one anion permeable membrane comprises Type II anion resins.

12. The electrodeionization apparatus of claim 9, further comprising an inert material layer positioned between said alternating layers of anion exchange resins and cation exchange resins.

13. The electrodeionization apparatus of claim 12, wherein said compartments are divided by at least one anion or cation permeable membrane, and said at least one anion permeable membrane comprises Type II anion resins.

14. The electrodeionization apparatus of claim 9, wherein said compartments are divided by at least one anion or cation permeable membrane, and said at least one anion permeable membrane comprises Type II anion resins.

15. The electrodeionization apparatus of claim 9, wherein said anion exchange resins further include anion exchange resins selected from the group consisting of Type II anion exchange resins, anion exchange resins with weak base surface groups, and mixtures thereof.

16. The electrodeionization apparatus of claim 9, further comprising an anolyte compartment and a catholyte compartment.

17. An electrodeionization apparatus, comprising:
   alternating layers of Type II anion exchange resins, Type I anion exchange resins, and cation exchange resins positioned in an ion-depleting component.

18. A method for purifying a fluid in an electrodeionization apparatus, comprising:
   providing an ion-concentrating compartment, an ion-depleting compartment, an anode, and a cathode;
   filling said ion-depleting compartment with alternating layers of cation and anion exchange resins, and positioning an intermediate material layer between said layers of anion exchange resins and cation exchange resins, wherein said anion exchange resins comprise Type II anion resins;
   passing a fluid stream through said ion-depleting compartment; and
   applying an electric field across said anode and cathode.

19. The method of claim 18, wherein said intermediate material layer is a Type I anion exchange resin layer.

20. The method of claim 19, wherein said compartments are divided by at least one anion or cation permeable membrane, and said at least one anion permeable membrane comprises Type II anion resins.

21. The method of claim 20, wherein the Type I anion exchange resin layer positioned between the alternating layers of anion exchange resins and cation resin exchange resins promotes water dissociation at the membrane/resin interface relative to the amount of water dissociation that occurs at the resin/resin interface, and continuously regenerates ion exchange resin material in said compartments.

22. The method of claim 18, wherein said intermediate material layer is an inert material layer.

23. The method of claim 22, wherein said compartments are divided by at least one anion or cation permeable membrane, and said at least one anion permeable membrane comprises Type II anion resins.

24. The method of claim 23, wherein the inert material layer positioned between the alternating layers of anion exchange resins and cation resin exchange resins promotes water dissociation at the membrane/resin interface relative to the amount of water dissociation that occurs at the resin/resin interface, and continuously regenerates ion exchange resin material in said compartments.

25. The method of claim 18, wherein said compartments are divided by at least one anion or cation permeable membrane, and said at least one anion permeable membrane comprises Type II anion resins.

26. The method of claim 18, wherein said anion exchange resins further include anion exchange resins selected from the group consisting of Type II anion exchange resins, anion exchange resins with weak base surface groups, and mixtures thereof.

27. The method of claim 18, further comprising filling said ion-concentrating compartment with alternating layers of cation exchange resins and anion exchange resins.

28. The method of claim 18, further comprising providing an anolyte compartment and a catholyte compartment.

29. An electrodeionization apparatus, comprising:

an ion-concentrating compartment;

an ion-depleting compartment, wherein alternating layers of anion exchange resins and cation exchange resins are positioned in said ion-depleting compartment, and said anion exchange resins comprise Type II anion resin material; and an anode and a cathode;

wherein said compartments are divided by at least one anion or cation permeable membrane, and said at least one anion permeable membrane comprises Type II anion exchange resins.

30. The electrodeionization apparatus of claim 29, further comprising a Type I anion exchange resin material layer positioned between said alternating layers of anion exchange resins and cation exchange resins.

31. The electrodeionization apparatus of claim 29, further comprising an inert material layer positioned between said alternating layers of anion exchange resins and cation exchange resins.

32. The electrodeionization apparatus of claim 29, further comprising alternating layers of cation exchange resins and anion exchange resins positioned within said ion-concentrating compartment.

33. The electrodeionization apparatus of claim 32, further comprising a Type I anion exchange resin material layer positioned between said alternating layers of anion exchange resins and cation exchange resins.

34. The electrodeionization apparatus of claim 33, wherein said compartments are divided by at least one anion or cation permeable membrane, and said at least one anion permeable membrane comprises Type II anion resins.

35. The electrodeionization apparatus of claim 32, further comprising an inert material layer positioned between said alternating layers of anion exchange resins and cation exchange resins.

36. The electrodeionization apparatus of claim 35, wherein said compartments are divided by at least one anion or cation permeable membrane, and said at least one anion permeable membrane comprises Type II anion resins.

37. The electrodeionization apparatus of claim 32, wherein said compartments are divided by at least one anion or cation permeable membrane, and said at least one anion permeable membrane comprises Type II anion resins.

38. The electrodeionization apparatus of claim 32, wherein said anion exchange resins further include anion exchange resins selected from the group consisting of Type II anion exchange resins, anion exchange resins with weak base surface groups, and mixtures thereof.

39. A method for purifying a fluid in an electrodeionization apparatus, comprising:

providing an ion-concentrating compartment, an ion-depleting compartment, an anode, and a cathode;

filling said ion-depleting compartment with alternating layers of cation and anion exchange resins, wherein said anion exchange resins comprise Type II anion resins, and wherein said compartments are divided by at least one anion or cation permeable membrane, said at least one anion permeable membrane comprises Type II anion exchange resins;

passing a fluid stream through said ion-depleting compartment; and applying an electric field across said anode and cathode.

40. The method of claim 39, further comprising positioning a Type I anion exchange resin layer between said alternating layers of anion exchange resins and cation exchange resins.

41. The method of claim 40, wherein the Type I anion exchange resin layer positioned between the alternating layers of anion exchange resins and cation resin exchange resins promotes water dissociation at the membrane/resin interface relative to the amount of water dissociation that occurs at the resin/resin interface, and continuously regenerates ion exchange resin material in said compartments.

42. The method of claim 39, further comprising an inert material layer positioned between said alternating layers of anion exchange resins and cation exchange resins.

43. The method of claim 42, wherein the inert material layer positioned between the alternating layers of anion exchange resins and cation resin exchange resins promotes water dissociation at the membrane/resin interface relative to the amount of water dissociation that occurs at the resin/resin interface, and continuously regenerates ion exchange resin material in said compartments.

44. The method of claim 39, further comprising filling said ion-concentrating compartment with alternating layers of cation exchange resins and anion exchange resins.

* * * * *